United States Patent [19]

Park et al.

[11]  4,341,849

[45]  Jul. 27, 1982

[54] SODIUM RESISTANT SEALING GLASSES AND SODIUM-SULFUR CELLS SEALED WITH SAID GLASSES

[75] Inventors: Dong-Sil Park; Manfred W. Breiter, both of Schenectady; Bruce S. Dunn, Saratoga Springs; Louis Navias, Schenectady, all of N.Y.

[73] Assignee: General Electric Company, Schenectady, N.Y.

[21] Appl. No.: 239,751

[22] Filed: Mar. 2, 1981

Related U.S. Application Data

[63] Continuation of Ser. No. 99,597, Dec. 3, 1979, abandoned, which is a continuation-in-part of Ser. No. 954,177, Oct. 24, 1978, abandoned.

[51] Int. Cl.$^3$ ............... H01M 10/36; C03C 3/14
[52] U.S. Cl. ............... 429/104; 429/193; 501/52; 501/77; 501/15
[58] Field of Search ............... 106/47 R, 54; 429/104, 429/193; 501/52, 77, 15

[56]  References Cited

U.S. PATENT DOCUMENTS

| | | | |
|---|---|---|---|
| 2,090,098 | 8/1937 | Berger et al. | 106/47 R |
| 3,275,358 | 9/1966 | Shorebarger | 106/47 R |
| 3,544,330 | 12/1970 | Hoffman | 106/47 R |
| 3,617,316 | 11/1971 | Suzuki et al. | 106/47 R |
| 3,946,751 | 3/1976 | Breiter et al. | 429/166 |
| 4,037,027 | 7/1977 | Desplanches et al. | 429/191 |
| 4,132,820 | 1/1979 | Mitoff | 428/65 |

*Primary Examiner*—Mark Bell
*Attorney, Agent, or Firm*—Jane M. Binkowski; James C. Davis, Jr.; Joseph T. Cohen

[57]  ABSTRACT

Sodium resistant sealing glasses have aluminoborate glass compositions in which glass stability is improved by the incorporation of specific mixtures of modifying alkali earth oxides of calcium oxide, strontium oxide and barium oxide. These modifying alkali earth oxides are present in a total weight percent range from 15 to 40 weight percent of the glass composition.

Also disclosed is the employment of the above glasses as seals in sodium-sulfur cells.

3 Claims, No Drawings

SODIUM RESISTANT SEALING GLASSES AND SODIUM-SULFUR CELLS SEALED WITH SAID GLASSES

This application is a continuation, of application Ser. No. 099,597, filed Dec. 3, 1979, now abandoned which is a continuation-in-part of Ser. No. 954,177 filed Oct. 24, 1978, now abandoned.

This invention relates generally to sodium resistant sealing glasses and, more particularly, to such glasses with aluminoborate glass compositions with specific modifying alkali earth oxides.

Such sodium resistant sealing glasses are useful for sealing a ceramic ring or flange to a solid electrolyte tube in a sodium-sulfur battery. Such a sodium-sulfur battery employing a sealing glass in this manner is described in U.S. Pat. No. 3,946,751—Breiter et al., entitled "Cell Casing With a Hermetic Mechanical Seal and A Hermetically Sealed Sodium-Sulfur Cell". This patent is assigned to the same assignee as the present application.

The term solid electrolyte tube as used above in the discussion of a sodium-sulfur battery, includes ion-conductive materials such as beta-alumina, beta"-alumina, mixtures thereof and related compounds.

In the above mentioned U.S. Pat. No. 3,946,751—Breiter et al., a cell casing and a hermetically sealed sodium-sulfur cell are disclosed and claimed wherein the cell casing includes a hermetic mechanical seal joining two opposed outer metallic casing portions to an electrically insulating ceramic ring supporting an inner casing of a solid ion-conductive material. The hermetically sealed sodium-sulfur cell has the above type of casing with a sodium negative electrode in the inner casing end and a positive electrode of sulfur in conductive material in an outer casing portion surrounding the inner casing. A glass seal seals a portion of the outer wall of the inner casing of the solid sodium ion-conductive material adjacent its open end within and to the ceramic ring.

In U.S. Pat. No. 4,132,820 issued Jan. 2, 1979, and entitled "Composite Body With Beta-Alumina Substrate and Glass Coating Thereon", there is described and claimed a composite body with a glass coating which has sodium resistance, low alkali ion-conductance and a thermal expansion of 7.3 to $6.1 \times 10^{-6}$ inches/inch/°C. The glass coating compositions can be selected from the table set forth in column 3, the specific glass coatings set forth in column 3, or the table set forth in columns 3 and 4 of the above-mentioned co-pending patent application. As opposed to the present invention, none of the glass coatings set forth in the above-identified patent recite a combination of modifying oxides of calcium oxide, strontium oxide and barium oxide in a range of 15 to 40 weight percent of the glass composition. This patent is assigned to the same assignee as the present application.

Our invention is directed to improve sodium resistant sealing glasses which contain a combination of modifying oxides in specific weight percent ranges to improve the stability of the sealing glasses.

The primary object of our invention is to provide improved sodium resistant sealing glasses which are useful to seal a ceramic ring or flange to a solid electrolyte tube in a sodium-sulfur battery.

In accordance with one aspect of our invention, sodium resistant sealing glasses have aluminoborate glass compositions including mixtures of specific modifying alkali earth oxides for glass stability.

These and various other objects, features and advantages of the invention will be better understood from the following description:

Sodium-sulfur cells incorporate generally a sealing glass in the ceramic-to-ceramic seal between an electrically insulating flange and a solid ion-conductive electrolyte made generally of beta or beta"-alumina. In most sodium-sulfur cell designs, the sealing glass is in contact with molten sodium from the sodium compartment of the sodium-sulfur cell and, therefore, it must offer adequate resistance against sodium attack. Further, substantial changes in the sealing glass composition are liable to occur during the sealing of the flange to the electrolyte due to ionic interdiffusion between the glass and the ceramic component. This effect of change in glass composition is particularly serious at the glass-electrolyte interface. Our studies have indicated that such changes lead to glass devitrification and deleterious thermal expansion mismatches between sealed components with resulting seal failures and termination of cell operation.

We have found improved sodium resistant sealing glasses which offer good sodium resistance as well as stability against interfacial reactions and devitrification. Our sealing glasses have been selected from aluminoborate compositions containing specific mixtures of alkali earth oxides. Ceramographic examinations of seals and results of seal tests for extended cycling indicated the excellent behavior of our improved sodium resistant sealing glasses. The unique properties of our sealing glasses make them suitable for other types of seals where sodium resistance is desired.

Previously, silicate and borosilicate glasses have been used as sealing glasses in sodium-sulfur cells. For example, in U.S. Pat. No. 4,037,027, there is described a borosilicate glass of the composition having 70.36% $SiO_2$, 1.88% $Al_2O_3$, 19.56% $B_2O_3$ and 8.20% $Na_2O$. As opposed to silicate and borosilicate glasses, we employ an aluminoborate sealing glass with specific mixtures of modifying alkali earth oxides of calcium oxide, strontium oxide and barium oxide, with resulting glass stability. These aluminoborate glass compositions are more resistant to sodium attack than silicate or borosilicate glasses. Thus, our improved sodium resistant sealing glasses provide good sodium resistance and excellent glass stability.

We found that we could form sodium resistant aluminoborate sealing glasses which comprise 10 to 30 weight percent alumina, 35 to 50 weight percent boron oxide, 15 to 40 total weight percent of mixtures of alkali earth oxides of 2 to 15 weight percent of calcium oxide, 2 to 15 weight percent of barium oxide and 2 to 15 weight percent of strontium oxide, 0 to 20 weight percent of silica, and 0 to 5 weight percent of a mixture of alkali metal oxides of sodium oxide, lithium oxide, and potassium oxide. The resulting sealing glasses had excellent sodium resistant properties and improved glass stability. We found further that these sealing glasses had a thermal expansion coefficient which matched closely that of both beta-aluminas and alpha-alumina, which are employed generally as the ion-conductive tube and the electrically insulating flange in a sodium-sulfur battery, respectively. We found two preferred sodium resistant aluminoborate sealing glasses within the composition ranges of our sealing glasses. One sealing glass consisted of 19 weight percent alumina, 45 weight percent boron oxide, 6 weight percent calcium oxide, 12 weight percent barium oxide, 10 weight percent strontium oxide, and 8 weight percent silica. The other sealing glass consisted of 19 weight percent alumina, 45 weight percent boron oxide, 7 weight percent calcium oxide, 6 weight percent barium oxide, 13 weight percent strontium oxide, and 10 weight percent silica.

The sodium stability of our two preferred sealing glass compositions was clearly demonstrated in accelerated tests with virgin glasses. After 160 hours at 350° C. in sodium vapor, both of our aluminoborate glass compositions exhibited little, if any, discoloration. However, a high silica sealing glass consisting of 50 weight percent silica, 10 weight percent alumina, 30 weight percent barium oxide, and 10 weight percent boron oxide turned dark brown. Discoloration effects, although qualitative, indicate the presence of metallic sodium in the glass and thus provide a measure of sodium permeability. Excess sodium migration within the sealing glass is generally accompanied by fracture processes which, in the case of sodium-sulfur batteries, lead to cell failure.

A second significant property of our sodium resistant aluminoborate sealing glasses is the stability of the glass and its resistance to devitrification. That is, the sealing glasses must be able to withstand slight changes in composition without crystallizing. The temperatures involved in the sealing operation enable ionic diffusion and even some dissolution to occur. If the local composition of the sealing glasses is altered sufficiently during the sealing operation, a new phase may form which, because of thermal expansion mismatch may lead to fracture in the sealing area. Such a process would cause the sodium-sulfur cell to fail. We have provided glass stability thereby increasing its resistance to devitrification by the incorporation of specific mixtures of modifying alkali earth oxides in a total weight percent range from 15 weight percent to 40 weight percent of the glass composition. The specific mixture of these modifying oxides with a total weight percent range from 15 to 40 weight percent are 2 to 15 weight percent calcium oxide, 2 to 15 weight percent of barium oxide and 2 to 15 weight percent of strontium oxide. The inclusion of these specific mixtures of modifying alkali earth oxides insures that the glass composition remains in the glass forming region despite slight changes in composition during the sealing operation. Additionally, the thermal expansion coefficient of our sealing glasses closely matches that of both the beta-aluminas and the alpha-alumina.

Our sodium resistant aluminoborate sealing glasses are also thermally compatible with various borosilicate glasses and a wide variety of metals, such as Kovar alloy, molybdenum, etc., developed for ceramic-to-metal seals. We have recently made successful ceramic-to-metal seals of alpha-alumina to Kovar alloy and alpha-alumina to molybdenum with our sodium resistant aluminoborate sealing glasses.

In the preparation of our sodium resistant aluminoborate sealing glasses, we mix together the chemicals which on melting, decomposing and reacting yield 10 to 30 weight percent alumina, 35 to 50 weight percent boron oxide, 15 to 40 total weight percent of mixtures of alkali earth oxides of 2 to 15 weight percent of calcium oxide, 2 to 15 weight percent of barium oxide and 2 to 15 weight percent of strontium oxide, 0 to 20 weight percent of silica, and 0 to 5 weight percent of a mixture of metal alkali oxides selected from the group consisting of sodium oxide, lithium oxide, and potassium oxide. The mixed batches are then melted in an air atmosphere at a temperature in a range from 1000° C. to 1300° C. The molten glasses are poured into molds to form the glasses in convenient shapes such as blocks. The glasses are then cooled to room temperature to provide the sodium resistant aluminoborate sealing glasses of our invention.

When such sealing glasses are used for sealing together two components, for example, the flange and the outer wall of an ion-conductive tube in a sodium-sulfur battery, the glass is ground to reduce the above glass block to small particle size. A flange or ring of alpha-alumina is positioned around and adjacent the open end of the ion-conductive electrolyte tube of beta-alumina. The flange has a lower inner portion which abuts against the outer wall of the tube while the inner, upper portion of the flange is recessed. The flange and tube are held in position by a suitable fixture to form an assembly. The glass particles of the sealing glass are positioned in the recess between the outer surface of the tube and the upper portion of the adjacent flange. The tube and flange with the particles positioned therebetween as above described, are then heated to a temperature of about 900° C. in an air atmosphere to melt the glass particles into a molten state. The assembly is then cooled to room temperature with a resulting sodium resistant aluminoborate sealing glass sealing the flange to the outer wall of the tube. A sodium-sulfur cell is then constructed in accordance, for example, with the above mentioned U.S. Pat. No. 3,946,751.

Examples of our sodium resistant aluminoborate sealing glass made in accordance with our invention are set forth below:

EXAMPLE I

A sodium resistant aluminoborate sealing glass was formed by mixing together the chemicals which on melting, decomposing and reacting yield 19 weight percent alumina, 45 weight percent boron oxide, 6 weight percent calcium oxide, 12 weight percent barium oxide, 10 weight percent strontium oxide and 8 weight percent silica. This mixed batch was heated to a temperature of 1100° C. in an air atmosphere to provide molten glass. The molten glass was poured into a block-shaped mold and allowed to cool. The resultant block was a sodium resistant aluminoborate sealing glass made in accordance with our invention.

EXAMPLE II

A sodium resistant aluminoborate sealing glass was formed by mixing together the chemicals which on melting, decomposing and reacting yield 19 weight percent alumina, 45 weight percent boron oxide, 7 weight percent calcium oxide, 6 weight percent barium oxide, 13 weight percent strontium oxide, and 10 weight percent silica. This mixed batch was heated to a temperature of 1100° C. in an air atmosphere to provide molten glass. The molten glass was poured into a block shaped mold and allowed to cool. The resultant block was a sodium resistant aluminoborate sealing glass made in accordance with our invention.

EXAMPLE III

A block of sodium resistant aluminoborate sealing glass made in accordance with Example I, was subjected for 160 hours at 350° C. in sodium vapor. The sealing glass exhibited little, if any, discoloration. For comparison purposes, a high silica sealing glass was prepared in a conventional manner, which glass consisted of 50 weight percent silica, 10 weight percent alumina, 30 weight percent barium oxide and 10 weight percent boron oxide. This high silica glass was subjected in the same manner as our sealing glass to sodium vapors for 160 hours at 350° C. The high silica sealing glass turned dark brown indicating the presence of metallic sodium in the glass and thus providing a measure of sodium permeability.

EXAMPLE IV

Blocks of sodium resistant aluminoborate sealing glass were prepared in accordance with Example I. These blocks were ground to a small particle size. Fifty sodium beta ion-conductive tubes were each provided with an alpha-alumina flange around its outer surface and adjacent its open end. Each flange had a lower portion which abutted the outer wall of the respective tube while the upper portion provided a recess between the outer wall of the tube and the flange. Sealing glass particles were positioned in each of these recesses. Each tube and its associated flange with sealing glass particles was held in position by a fixture to provide an assembly. Each assembly was heated to a temperature of 900° C. in an air atmosphere after which it was cooled to room temperature resulting in a sodium resistant aluminoborate sealing glass seal between the exterior wall of the tube and the inner surface of the flange.

EXAMPLE V

Fifty sodium-sulfur cells employing the fifty sealed tubes and flanges from Example IV were made in accordance with the above mentioned U.S. Pat. No. 3,946,751. These fifty cells were tested in actual operation for a period of six months. Subsequent investigation of these tubes showed no failures in the sodium resistant aluminoborate sealing glass seals. Further, such investigation showed that the sodium attack of the sealing glass was negligible during the cell testing.

While other modifications of the invention and variations thereof which may be employed within the scope of the invention have not been described, the invention is intended to include such as may be embraced within the following claims:

What we claim as new and desire to secure by Letters Patent of the United States is:

1. In a sodium-sulfur cell having an electrically insulating alpha alumina ceramic supporting a solid ion-conductive ceramic electrolyte selected from the group consisting of beta-alumina, beta"-alumina and mixtures thereof, the improvement consisting of a sodium resistant aluminoborate sealing glass sealing said alpha alumina ceramic to said ceramic electrolyte, said sealing glass being significantly stable against interfacial reactions and significantly resistant to devitrification consisting of 10 to 30 weight percent alumina, 35 to 50 weight percent boron oxide, 15 to 40 total weight percent of a mixture of alkali earth oxides consisting of 2 to 15 weight percent of calcium oxide, 2 to 15 weight percent of barium oxide and 2 to 15 weight percent of strontium oxide, 0 to 20 weight percent of silica, and 0 to 5 weight percent of a mixture of alkali metal oxides of sodium oxide, lithium oxide, and potassium oxide.

2. A sodium resistant aluminoborate sealing glass consisting essentially of 19 weight percent alumina, 45 weight percent boron oxide, 6 weight percent calcium oxide, 12 weight percent barium oxide, 10 weight percent strontium oxide, and 8 weight percent silica.

3. A sodium resistant aluminoborate sealing glass consisting essentially of 19 weight percent alumina, 45 weight percent boron oxide, 7 weight percent calcium oxide, 6 weight percent barium oxide, 13 weight percent strontium oxide, and 10 weight percent silica.

* * * * *